United States Patent
Konya et al.

(10) Patent No.: US 6,777,152 B2
(45) Date of Patent: Aug. 17, 2004

(54) ELECTROSTATIC IMAGE DEVELOPER

(75) Inventors: Yoshiharu Konya, Annaka (JP); Koichiro Watanabe, Annaka (JP); Susumu Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 65 days.

(21) Appl. No.: 10/179,968

(22) Filed: Jun. 26, 2002

(65) Prior Publication Data

US 2003/0059700 A1 Mar. 27, 2003

Related U.S. Application Data

(63) Continuation-in-part of application No. 10/108,716, filed on Mar. 29, 2002, now abandoned.

(30) Foreign Application Priority Data

| Mar. 30, 2001 | (JP) | 2001-102017 |
| Jun. 18, 2001 | (JP) | 2001-183101 |
| Feb. 24, 2002 | (EP) | 02252368 |

(51) Int. Cl.$^7$ ................................. G03G 9/08
(52) U.S. Cl. ................... 430/108.6; 430/137.1
(58) Field of Search ............... 430/108.6, 137.1

(56) References Cited

U.S. PATENT DOCUMENTS

| 4,828,954 A | * | 5/1989 | Hashimoto et al. ......... 430/110 |
| 5,422,214 A | | 6/1995 | Akiyama et al. |
| 5,424,129 A | * | 6/1995 | Lewis et al. ................ 428/403 |
| 5,451,390 A | | 9/1995 | Hartmann et al. |
| 5,989,768 A | * | 11/1999 | Little ........................ 430/110 |
| 6,130,020 A | | 10/2000 | Wada et al. |

FOREIGN PATENT DOCUMENTS

| EP | 0957407 A2 | 11/1999 |
| EP | 1050782 A1 | 11/2000 |
| JP | 2153816 | 6/1990 |

* cited by examiner

Primary Examiner—John Goodrow
(74) Attorney, Agent, or Firm—Birch, Stewart, Kolasch & Birch, LLP

(57) ABSTRACT

By atomizing a siloxane and an organic titanium compound for flame combustion, spherical complex oxide fine particles of amorphous silica-titania are obtained having a particle size of 10–300 nm, a specific surface area of 10–100 m$^2$/g, and a titania content of 1–99% by weight. By hydrophobizing the fine particles and adding them to a toner, a developer is obtained which is improved in fluidity, cleanability and uniform and stable charging.

13 Claims, No Drawings

ELECTROSTATIC IMAGE DEVELOPER

CROSS REFERENCE TO RELATED APPLICATION

This application is a continuation-in-part of copending application Ser. No. 10/108,716 filed on Mar. 29, 2002, now abandoned, the entire contents of which are hereby incorporated by reference.

This invention relates to a developer for developing electrostatic images in electrophotography and electrostatic recording process.

BACKGROUND OF THE INVENTION

Dry developers used in electrophotography and similar processes are generally divided into a one-component developer using a toner having a colorant dispersed in a binder resin alone and a two-component developer using the toner in admixture with a carrier. When these developers are used in copying operation, the developers must satisfy many factors such as fluidity, anti-caking, fixation, charging ability and cleanability in order that they adapt to the process.

For the purpose of improving the fluidity, anti-caking, fixation and cleanability, and adjusting and stabilizing the charging ability, inorganic fine particles of silica, titania, alumina, etc. having a smaller particle size than the toner particles are often added as the external additive.

As the copying speed is accelerated in the recent years, the developer is required to have more fluidity, cleanability, and stable and uniform charging ability. To produce images of better quality, the toner has shifted to a small particle size one. As compared with conventional toners commonly used in the art, the small particle size toner is poor in powder flow and its charging ability is readily altered by additives such as external additive. Then, depending on the type and particle size of inorganic fine particles such as silica fine particles added to the toner, the small particle size toner does not necessarily promise satisfactory results with respect to fluidity, charging ability and cleanability. A choice of the inorganic fine, particles added thereto is important. Commonly used silica fine particles, whose mean particle size of primary particles is as small as 10 to 20 nm, are highly cohesive to each other and poorly dispersible, failing to meet the requirements of fluidity and cleanability. Using spherical silica fine particles is effective in improving fluidity and increasing the charge quantity, but due to an excessive charge quantity, the electrostatic adhesive force of fine particles to the toner support becomes stronger, resulting in a lowering of development, a lower image density and density variations. The silica fine particles used sometimes contain impurities, which affect the charging ability of the developer.

On the other hand, titania fine particles having a low charging ability are further added for the purpose of controlling the charge quantity. However, crystalline titania fine particles used in the art are poor in fluidity and dispersibility due to their non-spherical shape. If a certain amount of crystalline titania fine particles are added for adjusting the charge quantity, they aggravate fluidity and dispersion, which are likely to incur liberation of the developer from the toner support, resulting in images being fogged (background staining). A compromise approach is to provide for fluidity by taking advantage of spherical silica fine particles and to adjust the charge quantity by blending silica fine particles with titania fine particles. In order that these functions be exerted in a satisfactory and consistent manner, the silica and titania fine particles must be intimately and completely mixed in a predetermined mixing proportion. However, complete mixing of fine particles is difficult, and such mixing is frequently accompanied with segregation and local variation of charging ability.

SUMMARY OF THE INVENTION

An object of the invention is to provide an electrostatic image developer having improved fluidity and cleanability as well as a stable charging ability.

We have found that when spherical complex oxide fine particles of amorphous silica-titania obtained by atomizing a siloxane and an organic titanium compound in a flame for combustion, having a particle size of 10 to 300 nm, a specific surface area of 10 to 100 m$^2$/g, and a titania content of 1 to 99% by weight are added as inorganic fine particles to toner particles, there is obtained an electrostatic image developer which exhibits smooth flow, effective cleaning and uniform and stable charging performance. As used herein, silica is silicon oxide and titania is titanium oxide.

Accordingly, the invention provides an electrostatic image developer comprising spherical complex oxide fine particles of amorphous silica-titania obtained by atomizing a siloxane and an organic titanium compound in a flame for combustion, having a particle size of 10 to 300 nm, a specific surface area of 10 to 100 m$^2$/g, and a titania content of 1 to 99% by weight.

Preferably, the complex oxide fine particles are substantially free of chlorine. The organic titanium compound is typically selected from among a tetraalkoxytitanium compound, titanium acylate compound, alkyltitanium compound and titanium chelate compound.

In one preferred embodiment, the complex oxide fine particles have been prepared by simultaneously atomizing the siloxane and the organic titanium compound into a flame for oxidative combustion, in which method, based on the siloxane, the organic titanium compound, a combustion-assisting gas and a combustion-supporting gas fed to a burner, the siloxane, the organic titanium compound and the combustion-assisting gas when burned have an adiabatic flame temperature within a range of 1,650° C. to 4,000° C.

The complex oxide fine particles are preferably hydrophobized fine particles having introduced at their surface units represented by the following formula (1):

$$R^1_x R^2_y R^3_z SiO_{(4-x-y-z)/2} \qquad (1)$$

wherein $R^1$, $R^2$ and $R^3$ each are independently a substituted or unsubstituted monovalent hydrocarbon group having 1 to 6 carbon atoms, x, y and z each are an integer of 0 to 3, x+y+z is from 1 to 3.

DESCRIPTION OF THE PREFERRED EMBODIMENTS

The electrostatic image developer of the invention is arrived at by adding spherical complex oxide fine particles of silica-titania to toner particles.

The toner used herein may be any of well-known toners primarily comprising a binder resin and a colorant. If necessary, a charge controlling agent may be added to the toner. Examples of the binder resin used in the toner include homopolymers and copolymers of styrenes such as styrene, chlorostyrene and vinylstyrene, monoolefins such as ethylene, propylene, butylene and isobutylene, vinyl esters such as vinyl acetate, vinyl propionate, vinyl benzoate and vinyl lactate, acrylates and methacrylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, vinyl ethers such as vinyl methyl ether, vinyl ethyl ether and vinyl butyl ether, and ketones such as vinyl methyl ketone, vinyl hexyl ketone, vinyl isopropenyl ketone and vinyl ketone, though the resin is not limited thereto. Typical binder resins are polystyrene, styrene-alkyl acrylate copolymers, styrene-acrylonitrile copolymers, styrene-butadiene copolymers, styrene-maleic anhydride copolymers, polyethylene and polypropylene. Besides, polyesters, polyurethanes, epoxy resins, silicone resins, polyamides, modified rosin, paraffin and wax are also useful.

The colorant used in the toner is not critical. Typical colorants include carbon black, Nigrosine dyes, Aniline Blue, Chalcoyl Blue, Chrome Yellow, Ultramarine Blue, Dupont Oil Red, Quinoline Yellow, Methylene Blue chloride, Phthalocyanine Blue, Malachite Green oxalate, Lamp Black, and Rose Bengale. Another useful toner powder is a magnetic toner powder having a magnetic material incorporated therein.

The spherical complex oxide fine particles of silica-titania are obtained by simultaneously atomizing a siloxane and an organic titanium compound in a flame for oxidative combustion.

The siloxane used herein is typically a halogen-free organopolysiloxane which is selected, for example, from among linear organosiloxanes having the following general formula (2):

$$(R^4)_3SiO[SiR^5R^6O]_mSi(R^4)_3 \qquad (2)$$

wherein each of $R^4$, $R^5$ and $R^6$ which may be the same or different is a monovalent hydrocarbon group, alkoxy or hydrogen, and m is an integer inclusive of 0, cyclic organosiloxanes having the following general formula (3):

$$[SiR^5R^6O]_n \qquad (3)$$

wherein $R^5$ and $R^6$ are as defined above and n is an integer of at least 3, and mixtures thereof.

The monovalent hydrocarbon groups represented by $R^4$–$R^6$ include $C_1$–$C_6$ alkyl groups, alkenyl groups such as vinyl, and phenyl groups. Of these, lower alkyl groups such as methyl, ethyl and propyl are preferable, with methyl being most preferred. The alkoxy groups represented by $R^4$–$R^6$ are those of 1 to 6 carbon atoms, such as methoxy and ethoxy, with methoxy being most preferred. The letter m is an integer of $m \geq 0$, preferably 0 to 100, and more preferably 0 to 10; and n is an integer of $n \geq 3$, preferably 3 to 10, and more preferably 3 to 7.

Exemplary of the organosiloxane are hexamethyldisiloxane, octamethyltrisiloxane, octamethylcyclotetrasiloxane, and decamethylcyclopentasiloxane. These siloxanes are preferably purified products which are free of halogen (e.g., chlorine).

On the other hand, the organic titanium compound is usually selected from among tetraalkoxytitanium compounds, titanium acylate compounds, alkyltitanium compounds and titanium chelate compounds. Preferably they are substantially free of chlorine. More illustratively, the organic titanium compounds used herein include tetraalkoxy-titanium compounds represented by the following general formula (4):

$$Ti(OR^7)_4 \qquad (4)$$

wherein $OR^7$ is an alkoxy group, preferably $C_{1-8}$ alkoxy such as methoxy, ethoxy, propoxy, isopropoxy or butoxy, titanium acylate compounds represented by the following general formula (5):

$$Ti(OCOR^8)_4 \qquad (5)$$

wherein $COR^8$ is an acyl group such as formyl, acetyl, propionyl, butyryl, valeryl, caproyl, heptanoyl, or octanoyl, alkyltitanium compounds represented by the following general formula (6):

$$TiR^9_4 \qquad (6)$$

wherein $R^9$ is an alkyl group, preferably $C_{1-8}$ alkyl such as methyl, ethyl, propyl, butyl or pentyl, and titanium chelate compounds represented by the following general formula (7) or (8):

$$(R^{10}O)_2Ti(OR^{11}OH)_2 \qquad (7)$$

$$(R^{10}O)_2Ti(OR^{11}NH_2)_2 \qquad (8)$$

wherein $OR^{10}$ is an alkoxy group, preferably $C_{1-8}$ alkoxy such as methoxy, ethoxy, propoxy, isopropoxy or butoxy, $R^{11}$ is an alkylene group, preferably $C_{1-8}$ alkylene such as methylene, ethylene, trimethylene, tetramethylene or methylethylene.

Of the organic titanium compounds, those which are solid at room temperature are preferably dissolved in suitable solvents such as siloxanes, alcohols (e.g., methanol, ethanol, propanol and butanol) and hydrocarbon solvents (e.g., toluene and xylene) prior to use. As the molecular weight of the organic titanium compound increases, the formation ratio of titanium oxide to the starting organic titanium compound becomes lower, losing economy. For these reasons, liquid organic titanium compounds capable of forming titanium oxide at a formation ratio of at least 0.2 are preferred from the standpoint of economical efficiency. These organic titanium compounds are preferably purified products which are free of chlorine. Due to the substantial absence of impurities and the high purity, they are best suited as the reactant to form a complex oxide.

The siloxane and the organic titanium compound are mixed in liquid form and fed to a burner or separately fed to a burner whereby the mixture is atomized from the nozzle of the burner. In order to impart the shape of silica and the function of titania combined therewith to the resulting complex fine particles of silica-titania, the content of titania should be 1 to 99% by weight, preferably 5 to 95% by weight. The siloxane and the organic titanium compound are fed in such amounts that the combustion oxide may have a stoichiometric ratio giving a titania content within the range.

For the atomization of liquid, an atomizing medium such as air or steam may be used to assist in atomizing through the nozzle. If the organic titanium compound used is a hydrolyzable one, dehumidified, compressed air or nitrogen may be used as the atomizing medium.

Atomization may be carried out either by relying on the pressure of the liquid itself or by using centrifugal force. To achieve complete vaporization and pyrolysis for combustion, the atomized droplets should be very small, preferably having a size of up to 100 $\mu$m, more preferably up to 50 $\mu$m. To this end, the reactant liquids (siloxane and organic titanium compound) should preferably have a viscosity of up to 500 cs, more preferably up to 200 cs at 250° C.

The droplets of atomized siloxane and organic titanium compound are heated by their own combustion flame and by the auxiliary flame of a combustion-assisting gas, and undergo oxidative combustion concomitant with evaporation or pyrolysis. Synthesis of silica from the siloxane and synthesis of titania from the organic titanium compound occur simultaneously in the gas phase whereby silica and titania are fused together, resulting in spherical complex oxide fine particles of silica-titania.

Combustion forms core particles of silica and titania which coalesce and grow into particles whose ultimate size and shape are determined by the flame temperature, silica and titania concentrations, and residence time within the flame, with the flame temperature being predominant. At a low flame temperature, the particle size becomes close to 10 nm, which is about the same as that of fumed silica. Inducing the core particles to mutually collide and grow by coalescence into larger particles requires that coalescence and growth take place at a flame temperature which is at or above the melting point of silica: 1,423° C., and more preferably at or above the melting point of titania: 1,640° C.

The flame temperature is largely affected by the heat of combustion and the amount of excessive oxygen (air). In the case of complete combustion, the heat of combustion is determined by the type and amount of the siloxane, the organic titanium compound and a combustion-assisting gas. The siloxane as the silica source provides a substantial heat of combustion and hence, a high energy efficiency, as seen from the fact that hexamethyldisiloxane, a linear siloxane, has a heat of combustion of 1,389 kcal/mol or 8,550 kcal/kg, and octamethylcyclotetrasiloxane, a cyclic siloxane, has a heat of combustion of 1,974 kcal/mol or 6,650 kcal/kg. Like the siloxane, the organic titanium compound also provides a substantial heat of combustion as seen from the fact that tetraisopropoxytitanium has a heat of combustion of 1,623 kcal/mol or 5,710 kcal/kg, tetra-butoxysilane has a heat of combustion of 2,209 kcal/mol or 6,490 kcal/kg, and titanium acetylacetonate (or diisopropoxybisacetylacetonatotitanium) has a heat of combustion of 2,112 kcal/mol or 5,800 kcal/kg. Simultaneously burning the siloxane and the organic titanium compound creates a combustion flame with high thermal energy efficiency to promote formation of spherical particles.

To keep the combustion of siloxane and organic titanium compound stable and drive combustion to completion, an auxiliary flame is formed using a combustion-assisting gas. The combustion-assisting gas used here is preferably one which does not leave unburned residues following combustion. Suitable, non-limiting examples include hydrogen and hydrocarbon gases such as methane, propane and butane. However, a large amount of combustion-assisting gas results in the formation of combustion by-products such as carbon dioxide and steam, increasing the amount of combustion exhaust and reducing the silica and titania concentrations during combustion. Accordingly, the amount of combustion-assisting gas is typically set at not more than 2 moles, and preferably from 0.1 to 1.5 moles, per mole of the starting materials, siloxane and organic titanium compound combined.

Moreover, a combustion-supporting gas is added at the time of combustion. The combustion-supporting gas may be any oxygen-containing gas, such as oxygen or air. If the net amount of oxygen in the gas is insufficient, combustion of the siloxane, the organic titanium compound and the combustible gas used In the auxiliary flame (combustion-assisting gas) is incomplete, leaving carbon residues in the finished product. On the other hand, if a greater than stoichiometric amount of combustion-supporting gas is used, the silica and titania concentrations within the flame decrease and the flame temperature falls, which tends to suppress coalescence and growth of the particles. Supplying a large excess of the combustion-supporting gas results in the incomplete combustion of the siloxane and organic titanium compound, and excessively increases the load on powder collecting equipment in the exhaust system. Supplying combustion-supporting gas which contains a stoichiometric amount of oxygen allows the highest flame temperature to be achieved, but combustion tends to be incomplete. A small excess of oxygen is required to achieve complete combustion. Accordingly, it is advantageous for the combustion-supporting gas fed from the burner to include an amount of oxygen which is 1.0 to 4.0 times, and preferably 1.1 to 3.0 times, the stoichiometric amount of oxygen required for combustion. In addition to the gas fed from the burner, the combustion-supporting gas may be supplemented by by ambient air taken in along the burner.

The spherical complex oxide fine particles of silica-titania according to the invention should have a particle size of 10 to 300 nm, preferably 20 to 300 nm and a specific surface area of 10 to 100 $m^2/g$, preferably 15 to 90 $m^2/g$. If the particle size is less than 10 nm and the surface area is more than 100 $m^2/g$, then particles are likely to coalesce, failing to provide the developer with satisfactory flowing, anti-caking and fixing capabilities. If the particle size is more than 300 nm and the surface area is less than 10 $m^2/g$, then there can occur modification and scraping of the photoconductor drum and decreased adhesion to the toner.

The size of the complex oxide particles formed from combustion can be adjusted by varying the flame temperature, silica and titania concentrations and residence time within the flame. In the present invention, control of the flame temperature Is achieved in particular by controlling the adiabatic flame temperature calculated on a basis of the siloxane, organic titanium compound, combustion-assisting gas and combustion-supporting gas which are fed to the burner. "Adiabatic flame temperature," as used herein, refers to the highest temperature attained by combustion products and unburned residue, as an adiabatic system, through the consumption of heat released by combustion. The adiabatic flame temperature can be calculated as follows. Letting the amounts of heat released per hour by combustion of the siloxane, organic titanium compound and combustion-assisting gas fed to the burner be respectively $Q_1$, $Q_2$ and $Q_3$ (in units of kcal/h), the total heat of combustion Q is equal to the sum $Q_1+Q_2+Q_3$.

At the same time, letting the amounts of silica, titania, steam, $CO_2$, $O_2$ and $N_2$ formed per hour as a product or by-product of combustion, or remaining unreacted, be respectively $N_1$, $N_2$, $N_3$, $N_4$, $N_5$ and $N_6$ (in units of mol/h), letting the corresponding specific heats be $Cp_1$, $Cp_2$, $Cp_3$, $Cp_4$, $Cp_5$ and $Cp_6$ (in kcal/mol·° C.), letting the adiabatic flame temperature be ta (in ° C.), and assuming room temperature to be 25° C., given that the total amount of heat released by combustion is equivalent to the total amount of heat consumed, we get $$Q=(N_1Cp_1+N_2Cp_2+N_3Cp_3+N_4Cp_4+N_5Cp_5+N_6Cp_6)(ta-25).$$

The JANAF (Joint Army-Navy-Air Force) Thermochemical Tables indicate the standard enthalpy difference $H°_T - H_{298}$ (kJ/mol) between an absolute temperature of T in degrees Kelvin (T=t° C.+273) and an absolute temperature of 298 K (=250° C.) for various chemical substances. By referring to these tables, and letting the heat quantity consumed per mole of a chemical substance in raising the temperature of the substance from 25° C. to t° C. (where t=T−273) be E (in kcal/mol), we get $$E = Cp(t-25) = (H°_T - H_{298}) \times 0.2389.$$

It should be noted here that 1 kJ=0.2389 kcal. Based on this formula, letting the amount of heat consumed per mole in raising the temperature of silica, titania, steam, $CO_2$, $O_2$ and $N_2$ from 298 K (25° C.) to T K (where T=273+t° C.) be respectively $E_1$, $E_2$, $E_3$, $E_4$, $E_5$ and $E_6$ (kcal/mol), the temperature at which $$Q = N_1E_1 + N_2E_2 + N_3E_3 + N_4E_4 + N_5E_5 + N_6E_6$$

is the adiabatic flame temperature ta.

The adiabatic flame temperature may be controlled by adjusting such factors as the type, feed rate, and feed ratio to oxygen of the siloxane and organic titanium compound. If the burner supplies a large amount of excess oxygen or of an inert gas such as nitrogen which does not take part in combustion, this lowers the flame temperature, increases the fineness of the spherical complex oxide particles of silica-titania, and compromises coalescence and growth among the particles, both resulting in the formation of agglomerates and increasing the load on the exhaust collection system. If the adiabatic flame temperature for combustion of the siloxane, organic titanium compound and combustion-assisting gas, based on the siloxane, organic titanium compound, combustion-assisting gas and combustion-supporting gas fed to the burner is lower than 1,650° C., the complex oxide particles are very fine and fail to unite by coalescence and growth, becoming instead agglomerates and contributing to no improvement in flow. In addition, both the productivity and energy efficiency suffer. For these reasons, the adiabatic flame temperature must be at least 1,650° C., preferably at least 1,700° C. On the other hand, reducing the amount of inert gas and combustion-supporting gas raises the adiabatic flame temperature and increases the size of particles being formed. If the adiabatic flame temperature exceeds 4,000° C., then particles have a diameter in excess of 300 nm and a surface area of less than 10 m$^2$/g. Thus the adiabatic flame temperature must be up to 4,000° C., preferably up to 3,800° C.

Other than the foregoing, there are no limitations concerning the introduction of air or an inert gas such as nitrogen to prevent the deposition of powder on the walls of the combustion furnace or to cool the exhaust gases following combustion. The complex oxide fine particles thus obtained by combustion are carried on the exhaust gases and collected by means of a cyclone, pneumatic classifier or bag filter provided along the exhaust route.

In this way, complex oxide fine particles are produced which are spherical in shape, consist of silica and 1 to 99 wt % titania, are substantially free of chlorine, and have a particle size of 10 to 300 nm and a specific surface area of 10 to 100 m$^2$/g.

To minimize the variation of charge quantity with temperature and humidity, the complex oxide fine particles of silica-titania according to the invention are preferably hydrophobized, that is, fine particles having introduced at their surface units represented by the following formula (1):

$$R^1_x R^2_y R^3_z SiO_{(4-x-y-z)/2} \quad (1)$$

wherein $R^1$, $R^2$ and $R^3$ each are independently a substituted or unsubstituted monovalent hydrocarbon group having 1 to 6 carbon atoms, x, y and z each are an integer of 0 to 3, x+y+z is from 1 to 3.

Examples of the hydrocarbon group represented by $R^1$, $R^2$ and $R^3$ include alkyl groups such as methyl, ethyl, propyl, butyl, pentyl, hexyl and cyclohexyl, aryl groups such as phenyl, and alkenyl groups such as vinyl and allyl, with methyl being most preferred. The units of formula (1) can be introduced according to a well-known method of surface modifying silica fine powder. For example, a silazane compound represented by the formula: $R^1_3SiNHSiR^1_3$ is heated at a temperature of 50 to 400° C. in a gas, liquid or solid phase in the presence of water, for removing the excessive silazane compound.

Examples of the silazane compound: $R^1_3SiNHSiR^1_3$ include hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane. Among others, hexamethyldisilazane is most preferred for hydrophobic property achievable by modification and ease of its removal.

The electrostatic image developer of the invention is obtainable by adding the spherical complex oxide fine particles to toner particles. The amount of the spherical complex oxide fine particles blended is preferably 0.01 to 20 parts by weight, more preferably 0.1 to 10 parts by weight per 100 parts by weight of the toner particles. Less than 0.01 part of the oxide fine particles are insufficient to improve the fluidity of toner particles whereas more than 20 parts of the oxide fine particles adversely affect the charging ability. If necessary, additives such as a charge controlling agent, parting agent and wax may be blended in the developer.

These components may be mixed by any desired method. Use is made of, for example, rotary type mixers such as V-type mixers and double cone mixers, impeller mixers such as ribbon mixers and screw mixers, high-speed shear flow type mixers, and ball mills. As a result of mixing, the spherical complex oxide fine particles may be either attached or fused to surfaces of the toner particles.

The electrostatic image developer comprising spherical complex oxide fine particles of silica-titania according to the invention may be used as a one-component developer. It may also be used as a two-component developer after further mixing with a carrier. In the application as two-component developer, the toner may also be surface coated with the spherical complex oxide fine particles by adding the oxide fine particles during the mixing of the toner and the carrier rather than previously adding the oxide fine particles to the toner.

The carrier is in the form of particles having a mean particle size which is close to the particle size of the toner or up to 300 μm. Any well-known carrier may be used, for example, iron, nickel, cobalt, iron oxide, ferrite, glass beads, and particulate silicon. The carrier particles may be surface coated with fluoro-resins, acrylic resins or silicone resins.

The electrostatic image developer of the invention can be used in developing electrostatic latent images on photoconductor drums or dielectric-coated (electrostatic recording) media. More particularly, electrostatic latent images are electrophotographically formed on photoconductor drums made of inorganic photoconductive materials such as selenium, zinc oxide, cadmium sulfide and amorphous silicon, or organic photoconductive materials such as phthalocyanine pigments and bisazo pigments. Alternatively, electrostatic latent images are formed on dielectric-coated media having polyethylene terephthalate derivatives or the like by a needle electrode or the like. Then a developing process such as a magnetic brush, cascade or touch-down process is used to apply the electrostatic image developer of the invention to the electrostatic latent images for attaching the toner thereto.

The resulting toner images are then transferred to transfer media such as paper and fixed thereto to form duplicates. The residual toner on the surface of the photoconductor drum or the like is cleaned by a suitable process such as a blade, brush, web or roll process.

EXAMPLE

Examples of the invention are given below by way of illustration and not by way of limitation.

Examples 1–8

A mixture of hexamethyldisiloxane or octamethylcyclotetrasiloxane and tetraisopropoxytitanium or titanium acetylacetonate (diisopropoxybisacetylacetonatotitanium) was fed at room temperature and in a liquid state to a burner on top of a vertical combustion furnace. From an atomizing nozzle mounted at the tip of the burner, the mixture was atomized as a fine mist with the aid of air as the atomizing medium and combustion was induced by a propane-burning auxiliary flame. Oxygen and air were fed from the burner as combustion-supporting gases. The mixing ratio of hexamethyldisiloxane or octamethylcyclotetrasiloxane and tetraisopropoxytitanium or titanium acetylacetonate, the feed rates of the mixture, propane, oxygen and air (including atomizing air) in each example are shown in Tables 1 and 2, together with the respective adiabatic flame temperatures. Table 3 shows how the adiabatic flame temperature was calculated in Example 1.

The spherical complex oxide fine particles of silica-titania thus produced were recovered by collecting in a bag filter. The spherical complex oxide fine powder, 500 g, was admitted into a 5-liter high-speed agitation mixer equipped with a heating/cooling jacket. While agitating at 500 rpm, 25 g of deionized water was sprayed and fed to the powder in a closed state. Agitation was continued for 10 minutes. Subsequently, 25 g of hexamethyldisilazane was added and agitation was continued for a further 60 minutes in the closed state. With agitation, the powder was then heated at 150° C. and nitrogen was flowed for removing the ammonia gas formed and the residual agent, obtaining a hydrophobized spherical complex oxide fine powder.

The hydrophobized spherical complex oxide fine powder was measured for BET specific surface area by means of Micro-Sope 4232 II (Micro Data Co.). The particle size was measured by scanning electron microscopy (SEM). The particle shape on the resulting micrograph was analyzed using a particle shape analyzer Luzex F (manufactured by Nireco Co., Ltd.), from which all the particles were found to be spherical with a breadth-to-length ratio of at least 0.85. Titania contents, specific surface areas and particle sizes measured for the products obtained in examples are given in Tables 1 and 2. The chlorine impurity content was less than 0.1 ppm, as measured by ion chromatography.

Next, 4 parts by weight of Carmine 6BC as the colorant was added to 96 parts by weight of a polyester resin having Tg of 60° C. and a softening point of 110° C. They were melt milled, followed by grinding and classification. Toner particles having a mean particle size of 7 µm were obtained. The toner, 40 g, was mixed with 1 g of the hydrophobized spherical complex oxide fine powder in a sample mill, obtaining a developer. The developer was examined for fluidity, cleanability, and charging stability by the following tests. The results of evaluation are also shown in Tables 1 and 2.

Comparative Example 1

A developer was prepared as in Example 1 except that the feed rates of oxygen and air during the atomizing combustion were increased so that the adiabatic flame temperature was lower than 1,650° C., while the hydrophobizing conditions and the addition amount to the toner were the same as in Example 1. Table 2 shows the feed rates of the starting materials during combustion, burner gas conditions, and adiabatic flame temperature as well as the specific surface area and particle size distribution of hydrophobized fine particles, and the fluidity, cleanability and charging stability of the developer.

Comparative Example 2

A developer was prepared as in Example 1 except that a spherical silica fine powder was produced by atomizing only hexamethyldisiloxane for combustion without adding the organic titanium compound, while the hydrophobizing conditions and the addition amount to the toner were the same as in Example 1. Table 2 shows the feed rate of the starting material during combustion, burner gas conditions, and adiabatic flame temperature as well as the specific surface area and particle size distribution of hydrophobized fine particles, and the fluidity, cleanability and charging stability of the developer.

Evaluation of Fluidity

Cohesiveness was measured, from which fluidity was evaluated. The instrument used was Multi-Tester by Seishin Kigyo K.K. A developer, 3 g, was placed on a measurement unit having three sieves with an opening of 250 µm, 150 µm and 75 µm stacked from top, which was vibrated at an amplitude of 1 mm for 60 seconds. Provided that $W_1$, $W_2$ and $W_3$ (all in gram) are the weights of powder fractions left on the upper, intermediate and lower sieves, respectively, cohesiveness is given by the following equation. A powder with a cohesiveness of less than 6% is regarded satisfactory.

$$\text{Cohesivenss}(\%) = (W_1 + W_2 \times 0.6 + W_3 \times 0.2) \times 100/3$$

Evaluation of Cleanability

A printer equipped with an organic photoconductor drum was used. A two-component developer was prepared by admixing 100 parts by weight of the developer with 8 parts by weight of a carrier obtained by coating ferrite cores of 50 µm in diameter with a mixture of a perfluoroalkyl acrylate resin and an acrylic resin. By loading the two-component developer printer with the two-component developer as a starter and the developer as a replenisher, a printing test of 10,000 sheets of paper was conducted. The adhesion of the developer to the photoconductor drum was reflected by white spots in full solid images.

Evaluation of Charging Stability

By loading a one-component developer printer with the one-component developer in Example, a printing test of 10,000 sheets of plain paper was conducted. On the image transferred and fixed to plain paper, a fog level was measured using a color difference meter.

TABLE 1

| | Example | | | | | |
|---|---|---|---|---|---|---|
| | 1 | 2 | 3 | 4 | 5 | 6 |
| Type of siloxane | hexamethyl disiloxane | hexamethyl disiloxane | hexamethyl disiloxane | hexamethyl disiloxane | octamethyl cyclotetra siloxane | hexamethyl disiloxane |
| Type of organic Ti compound | tetraiso propoxy titanium | tetraiso propoxy titanium | tetraiso propoxy titanium | tetraiso propoxy titanium | tetraiso propoxy titanium | tetraiso propoxy titanium |
| Siloxane/Ti compound mixing weight ratio | 3:2 | 3:1 | 2:3 | 1:2 | 2:1 | 1:6 |
| Feed rate of mixture (kg/h) | 4.0 | 6.0 | 4.0 | 3.6 | 6.6 | 4.9 |
| Feed rate of propane ($Nm^3/h$) | 0.2 | 0.2 | 0.3 | 0.3 | 0.3 | 0.2 |
| Feed rate of oxygen ($Nm^3/h$) | 10.0 | 10.0 | 9.0 | 8.0 | 10.0 | 10.0 |
| Feed rate of air ($Nm^3/h$) | 20.0 | 18.0 | 28.0 | 35.0 | 15.0 | 20.0 |
| Adiabatic flame temperature (° C.) | 2,423 | 3,360 | 2,071 | 1,712 | 3,387 | 2,372 |
| Titania content (wt %) | 20.2 | 11.2 | 36.3 | 43.1 | 14.8 | 69.5 |
| BET specific surface area ($m^2/g$) | 40 | 30 | 60 | 80 | 30 | 45 |
| Particle size distribution (nm) | 40–200 | 60–300 | 30–150 | 20–100 | 60–300 | 40–180 |
| Fluidity (cohesiveness %) | 3.9 | 3.8 | 5.1 | 5.5 | 3.4 | 3.9 |
| Cleanability | no white spots | no white spots | no white spots | no white spots | no white spots | no white spots |
| Charging stability (fog level %) | 1.2 | 1.3 | 1.5 | 2.0 | 1.4 | 1.2 |

TABLE 2

| | Example | | Comparative Example | |
|---|---|---|---|---|
| | 7 | 8 | 1 | 2 |
| Type of siloxane | hexamethyl disiloxane | hexamethyl disiloxane | hexamethyl disiloxane | hexamethyl disiloxane |
| Type of organic Ti compound | titanium acetylacetonate | tetraisopropoxy titanium | tetraisopropoxy titanium | none |
| Siloxane/Ti compound mixing weight ratio | 3:1 | 7:1 | 1:1 | 1:0 |
| Feed rate of mixture (kg/h) | 3.6 | 7.0 | 3.0 | 4.2 |
| Feed rate of propane ($Nm^3/h$) | 0.2 | 0.3 | 0.2 | 0.2 |
| Feed rate of oxygen ($Nm^3/h$) | 10.0 | 11.0 | 7.0 | 12.0 |
| Feed rate of air ($Nm^3/h$) | 18.0 | 18.0 | 40.0 | 22.0 |
| Adiabatic flame temperature (° C.) | 2,499 | 3,785 | 1,410 | 2,543 |
| Titania content (wt %) | 9.0 | 5.4 | 27.5 | 0 |
| BET specific surface area ($m^2/g$) | 35 | 15 | 120 | 45 |
| Particle size distribution (nm) | 50–250 | 100–300 | 10–50 agglomerates | 50–250 |
| Fluidity (cohesiveness %) | 3.8 | 3.5 | 26 | 4.0 |
| Cleanability | no white spots | no white spots | white spots | some white spots |
| Charging stability (fog level %) | 1.3 | 1.2 | 9.8 | 6.1 |

TABLE 3

Calculation of adiabatic flame temperature in Example 1

Heat Released by Combustion

| Fuel | Feed rate (mol/h) | Heat of combustion (kcal/mol) | Amount of heat released by combustion (kcal/h) |
|---|---|---|---|
| Hexamethyldisiloxane | 14.78 | 1,389 | 20,530 |
| Tetraisopropyltitanium | 5.63 | 1,623 | 9,140 |
| Propane | 8.93 | 488 | 4,360 |
| Total | | | 34,030 |

Heat Consumed

| Products and unreacted substances | Amount formed N (mol/h) | E (kcal/mol) 25° C.→2,423° C. | Amount of heat consumed NE (kcal/h) |
|---|---|---|---|
| Silica | 29.56 | 43.23 | 1,280 |
| Titania | 5.63 | 49.91 | 280 |
| Nitrogen | 705.4 | 19.48 | 13,740 |
| Oxygen | 310.7 | 20.54 | 6,380 |
| Carbon dioxide | 183.0 | 32.01 | 5,860 |
| Steam | 247.5 | 26.22 | 6,490 |
| Total | | | 34,030 |

The invention offers many advantages. By atomizing a halogen-free purified siloxane and an organic titanium compound as starting materials for flame combustion, spherical complex oxide fine particles of high-purity amorphous silica-titania substantially free of chlorine are obtained. The high combustion temperature allows more core particles of silica-titania to generate and promotes coalescence and growth thereof, leading to spherical complex oxide fine particles having a particle size of 10 to 300 nm, a specific surface area of 10 to 100 m²/g, and a titania content of 1 to 99% by weight. By further hydrophobizing the fine particles and adding them to a toner, a developer is obtained which is improved in fluidity, cleanability and uniform and stable charging.

Japanese Patent Application No. 2001-183101 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electrostatic image developer comprising spherical complex oxide fine particles of amorphous silica-titania obtained by atomizing a siloxane and an organic titanium compound in a flame for combustion, having a particle size of 10 to 300 nm, a specific surface area of 10 to 100 m²/g, and a titania content of 1 to 99% by weight.

2. The developer of claim 1 wherein the complex oxide fine particles are substantially free of chlorine.

3. The developer of claim 1 wherein the organic titanium compound is selected from the group consisting of a tetraalkoxytitanium compound, titanium acylate compound, alkyltitanium compound and titanium chelate compound.

4. The developer of claim 1 wherein the complex oxide fine particles have been prepared by simultaneously atomizing the siloxane and the organic titanium compound into a flame for oxidative combustion, in which method, based on the siloxane, the organic titanium compound, a combustion-assisting gas and a combustion-supporting gas fed to a burner, the siloxane, the organic titanium compound and the combustion-assisting gas when burned have an adiabatic flame temperature within a range of 1,650° C. to 4,000° C.

5. The developer of claim 1 wherein the complex oxide fine particles are hydrophobized fine particles having introduced at their surface units represented by the following formula (1):

$$R^1_x R^2_y R^3_z SiO_{(4-x-y-z)/2} \quad (1)$$

wherein $R^1$, $R^2$ and $R^3$ each are independently a substituted or unsubstituted monovalent hydrocarbon group having 1 to 6 carbon atoms, x, y and z each are an integer of 0 to 3, x+y+z is from 1 to 3.

6. The developer of claim 1 further comprising toner particles.

7. The developer of claim 1 wherein the titanium compound is that of formula (4):

$$Ti(OR^7)_4 \quad (4)$$

wherein $OR^7$ is an alkoxy group.

8. The developer of claim 1 wherein the titanium compound is that of formula (5):

$$Ti(OCOR^8)_4 \quad (5)$$

wherein $COR^8$ is an acyl group.

9. The developer of claim 1 wherein the titanium compound is that of formula (6):

$$TiR^9_4 \quad (6)$$

wherein $R^9$ is an alkyl group.

10. The developer of claim 1 wherein the titanium compound is that of formula (7):

$$(R^{10}O)_2 Ti(OR^{11}OH)_2 \quad (7)$$

wherein $OR^{10}$ is an alkoxy group and $R^{11}$ is an alkylene group.

11. The developer of claim 1 wherein the titanium compound is that of formula(8):

$$(R^{10}O)_2Ti(OR^{11}N_2)_2 \qquad (8)$$

wherein $OR^{10}$ is an alkoxy group and $R^{11}$ is an alkylene group.

12. An electrostatic image developer comprising spherical complex oxide fine particles of amorphous silica-titania obtained by atomizing components consisting essentially of a siloxane and an organic titanium compound in a flame for combustion, having a particle size of 10 to 300 nm, a specific surface area of 10 to 100 m$^2$/g, and a titania content of 1 to 99% by weight.

13. The developer of claim 1, wherein said fine particles have a chlorine impurity context of less than 0.1 ppm.

* * * * *